US012610278B2

(12) United States Patent
Xu et al.

(10) Patent No.: US 12,610,278 B2
(45) Date of Patent: Apr. 21, 2026

(54) COMMUNICATION METHOD AND COMMUNICATION APPARATUS

(71) Applicant: HUAWEI TECHNOLOGIES CO., LTD., Shenzhen (CN)

(72) Inventors: Shengfeng Xu, Beijing (CN); Fangyuan Zhu, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 17/736,441

(22) Filed: May 4, 2022

(65) Prior Publication Data

US 2022/0272577 A1     Aug. 25, 2022

Related U.S. Application Data

(63) Continuation of application No. PCT/CN2019/116753, filed on Nov. 8, 2019.

(51) Int. Cl.
| | |
|---|---|
| *H04W 76/10* | (2018.01) |
| *H04W 8/00* | (2009.01) |
| *H04W 28/02* | (2009.01) |
| *H04W 28/08* | (2023.01) |
| *H04W 48/16* | (2009.01) |
| *H04W 88/04* | (2009.01) |

(52) U.S. Cl.
CPC ....... *H04W 28/0925* (2020.05); *H04W 8/005* (2013.01); *H04W 28/0263* (2013.01); *H04W 48/16* (2013.01); *H04W 76/10* (2018.02); *H04W 88/04* (2013.01)

(58) Field of Classification Search
CPC ............ H04W 28/0925; H04W 8/005; H04W 28/0263; H04W 48/16; H04W 76/10; H04W 88/04; H04W 48/18
See application file for complete search history.

(56) References Cited

U.S. PATENT DOCUMENTS

| | | | | |
|---|---|---|---|---|
| 2018/0054237 A1* | 2/2018 | Tseng | ................ | H04W 36/0022 |
| 2018/0332519 A1* | 11/2018 | Dou | ........................ | H04L 67/51 |
| 2019/0313236 A1* | 10/2019 | Lee | ...................... | H04L 41/0894 |

(Continued)

FOREIGN PATENT DOCUMENTS

| | | | | | |
|---|---|---|---|---|---|
| CN | 107079370 A | * | 8/2017 | ............ | H04W 76/14 |
| CN | 107211297 A | * | 9/2017 | ............ | H04W 24/04 |

(Continued)

OTHER PUBLICATIONS

ETSI TS 123 303 V15.1.0 (Jul. 2018), Universal Mobile Telecommunications System (UMTS); LTE; Proximity-based services (ProSe); Stage 2, (3GPP TS 23.303 version 15.1.0 Release 15), Jul. 2018, 130 pages.

(Continued)

*Primary Examiner* — Lakeram Jangbahadur
(74) *Attorney, Agent, or Firm* — Fish & Richardson P.C.

(57) ABSTRACT

The present disclosure relates to communication methods and communication apparatus. In one example method, a remote device obtains a first required session attribute or identification information of the first required session attribute, and sends a first message including the first required session attribute or the identification information of the first required session attribute.

9 Claims, 6 Drawing Sheets

Remote device          Relay device          RAN          UPF          Network

(56) References Cited

U.S. PATENT DOCUMENTS

2019/0349951 A1* 11/2019 Ahmad ................. H04W 76/18
2021/0084581 A1* 3/2021 Yang ..................... H04L 5/0096

FOREIGN PATENT DOCUMENTS

CN           110169097 A      8/2019
EP            3780804 A1 *   2/2021   ............ H04W 88/04
WO        2018129543 A1    7/2018
WO        2019031927 A1    2/2019
WO   WO-2019205027 A1 * 10/2019   ............ H04W 72/04

OTHER PUBLICATIONS

Huawei et al., "UE to Network Relay Authorization," 3GPP TSG-SA WG6 Meeting #7, S6-151101, Belgrade, Serbia, Apr. 20-24, 2015, 5 pages.

PCT International Search Report and Written Opinion issued in International Application No. PCT/CN2019/116753 on Aug. 13, 2020, 18 pages (with English translation).

ZTE, "Discussions on D2D UE-to-network Relay," 3GPP TSG-RAN WG1 Meeting #80bis, R1-151725, Belgrade, Serbia, Apr. 20-24, 2015, 6 pages.

CATT, "New KI: Support of Network Slicing for UE-to-Network Relay," 3GPP SA WG2 Meeting #135, S2-1909757, Split, Croatia, Oct. 14-18, 2019, 1 page.

Extended European Search Report issued in European Application No. 19951472.0 on Sep. 7, 2022, 9 pages.

Philips International B.V., "FS_REFEC—Proposed Requirements Text for Network Slicing," 3GPP TSG-SA WG1 Meeting #87, S1-192556, Sophia Antipolis, France, Aug. 19-23, 2019, 3 pages.

Office Action in Chinese Appln. No. 201980100705.1, dated May 25, 2023, 7 pages.

* cited by examiner

Remote          Relay
device          device          RAN          UPF

Apparatus 800

Processor 810

Transceiver 820

Memory 830

Antenna

910

Radio frequency circuit

920

Memory

Processor

Input/Output apparatus

COMMUNICATION METHOD AND COMMUNICATION APPARATUS

CROSS-REFERENCE TO RELATED APPLICATIONS

This application is a continuation of International Application No. PCT/CN2019/116753, filed on Nov. 8, 2019. The disclosure of which is hereby incorporated by reference in its entirety.

TECHNICAL FIELD

This application relates to the communication field, and more specifically, to a communication method and a communication apparatus.

BACKGROUND

With the rapid development of mobile communication, widespread use of a new service type, such as video chat, virtual reality (VR)/augmented reality (AR), increases a bandwidth requirement of a user. When a remote device is located outside a coverage area of an access network device, or quality of a communication signal between a remote device and an access network device is poor, the remote device may be assisted by a relay device. That is, communication between the remote device and the access network device is implemented through communication between the remote device and the relay device and communication between the relay device and the access network device. In other words, communication between the remote device outside the network coverage and the access network device is supported in a relay communication manner.

Therefore, how to select an appropriate relay device needs to be urgently resolved.

SUMMARY

This application provides a communication method and a communication apparatus, to help a remote device select a relay device satisfying a required session attribute, and to help improve communication efficiency.

According to a first aspect, a communication method is provided. The communication method includes: A remote device obtains a first required session attribute or identification information of the first required session attribute. The remote device sends a first message, where the first message includes the first required session attribute or the identification information of the first required session attribute.

The remote device obtains the first required session attribute or the identification information of the first required session attribute, and sends the first message including the first required session attribute or the identification information of the first required session attribute. In this way, a relay device may determine, based on the first message, whether the relay device can be a relay device of the remote device, to help the remote device select a relay device satisfying a required session attribute, and to help improve communication efficiency.

In some possible implementations, the method further includes: The remote device receives a response message that is of the first message and that is from a candidate relay device, where the response message of the first message is used to indicate that an allowed session attribute of the candidate relay device includes the first required session attribute. The remote device determines a target relay device of the remote device based on the response message of the candidate relay device, where the target relay device is configured to provide a relay service for the remote device.

If the allowed session attribute of the relay device includes the first required session attribute, the relay device sends the response message of the first message to the remote device. Alternatively, if the allowed session attribute of the relay device does not include the first required session attribute, the relay device does not send the response message of the first message. If the allowed session attribute of the relay device includes the first required session attribute, the response message of the first message is used to indicate that the allowed session attribute of the relay device includes the first required session attribute (that is, the relay device is allowed to use the first required session attribute). If the allowed session attribute of the relay device does not include the first required session attribute, the response message of the first message is used to indicate that the allowed session attribute of the relay device does not include the first required session attribute (that is, the relay device is not allowed to use the first required session attribute). The remote device can determine the target relay device of the remote device based on the response message of the candidate relay device. That is, the remote device can select a relay device satisfying a required session attribute, to improve communication efficiency.

In some possible implementations, the candidate relay device includes at least two relay devices, and the response message further includes another session attribute in addition to the first required session attribute in the allowed session attribute of the candidate relay device. That the remote device determines a target relay device of the remote device based on the response message of the candidate relay device includes: The remote device determines the target relay device based on the another session attribute of the candidate relay device.

If the remote device receives at least two response messages of the first message, that is, allowed session attributes of at least two relay devices include the first required session attribute, the remote device may select one relay device from the at least two relay devices as the target relay device. In this way, the remote device can communicate with a network device by using the target relay device, to find appropriate relay devices for different sessions, and improve communication efficiency.

In some possible implementations, the first required session attribute includes at least one of required slice information, data network information, an access type, or a session type.

In some possible implementations, the method further includes: The remote device sends a second message to the target relay device, where the second message includes a second required session attribute of the remote device or identification information of the second required session attribute of the remote device. The remote device receives a response message that is of the second message and that is from the target relay device, where the response message of the second message is used to indicate that an allowed session attribute of the target relay device includes the second required session attribute.

The remote device sends the second message to the target relay device, and the target relay device determines whether the second required session attribute is allowed, and responds to the second message. If the remote device determines that the target relay device allows the second required session attribute, the remote device may transmit, by using the target relay device, a service corresponding to the second required session attribute. That is, the target relay device may be configured to provide a relay service for both a service corresponding to the first required session attribute of the remote device and the service corresponding to the second required session attribute of the remote device. This reduces a procedure of searching for an appropriate relay device for the service corresponding to the second required session attribute, and reduces signaling overheads.

In some possible implementations, the identification information of the first required session attribute has a mapping relationship with the first required session attribute.

The remote device may indicate the first required session attribute by using the identification information of the first required session attribute. Compared with directly sending the first required session attribute, this method reduces resource overheads.

In some possible implementations, the identification information of the first required session attribute includes a group identifier ID or a relay service code of the remote device.

The remote device can reuse the group ID or the relay service code to indicate the first required session attribute. Compared with directly sending the first required session attribute, this method reduces resource overheads.

According to a second aspect, a communication method is provided. The method includes: A relay device receives a first message from a remote device, where the first message includes a first required session attribute or identification information of the first required session attribute. The relay device sends a response message of the first message to the remote device when an allowed session attribute of the relay device includes the first required session attribute.

The relay device receives, from the remote device, the first message including the first required session attribute or the identification information of the first required session attribute, and determines, based on the first message, whether the relay device can be a relay device of the remote device, to help the remote device select a relay device satisfying a required session attribute, and to help improve communication efficiency.

In some possible implementations, the first required session attribute includes at least one of required slice information, data network information, an access type, or a session type.

In some possible implementations, when the first required session attribute includes the required slice information, the method further includes: When an allowed slice of the relay device includes a first slice indicated by the required slice information, the relay device determines that the allowed session attribute of the relay device includes the first required session attribute.

If the relay device determines that the allowed slice includes the first slice, the relay device determines that the allowed session attribute includes the first required session attribute. If the relay device determines that the allowed slice does not include the first slice, the relay device determines that the allowed session attribute does not include the first required session attribute. Each relay device can determine, based on whether an allowed slice of the relay device includes the first slice, whether an allowed session attribute of the relay device includes the first required session attribute, and then determine whether to send the response message of the first message to the terminal, so that the remote device can select, based on the response message of the first message, a relay device satisfying the first required session attribute, to further select a more appropriate relay device, and improve communication efficiency.

In some possible implementations, when the first required session attribute includes the required slice information, the method further includes: The relay device sends a request message to an access network device when a configured slice of the relay device includes a first slice indicated by the required slice information, where the request message is used to request authorization for the first slice. The relay device receives a response message of the request message, where the response message of the request message is used to indicate that the first slice is an allowed slice. The relay device determines, based on the response message, that the allowed session attribute of the relay device includes the first required session attribute.

If the relay device determines that the configured slice includes the first slice, the relay device sends the request message to a network device. The request message is used to request authorization for the first slice. Specifically, the relay device sends the request message to an AMF, and then the AMF sends the request message to a UDM. The UDM determines whether to authorize the first slice as the allowed slice. The relay device receives the response message of the request message from the UDM. The response message of the request message is used to indicate whether the first slice is the allowed slice. If the response message of the request message indicates that the first slice is the allowed slice, the relay device determines that the allowed session attribute of the relay device includes the first required session attribute. In this way, when the remote device selects the relay device as the target relay device, a procedure of authorizing the configured slice as the allowed slice can be reduced, thereby reducing a transmission delay.

In some possible implementations, the identification information of the first required session attribute has a mapping relationship with the first required session attribute. The method further includes: The relay device determines the first required session attribute based on the mapping relationship and the identification information of the first required session attribute.

The relay device can determine the first required session attribute by using the identification information of the first required session attribute and the mapping relationship. Compared with directly sending the first required session attribute, this method reduces resource overheads of the remote device.

In some possible implementations, the identification information of the first required session attribute includes a group identifier ID or a relay service code of the remote device.

The remote device can reuse the group ID or the relay service code to indicate the first required session attribute. Compared with directly sending the first required session attribute, this method reduces resource overheads.

In some possible implementations, the method further includes: The relay device receives a second message from the remote device, where the second message includes a second required session attribute of the remote device. The relay device sends a response message of the second message when the allowed session attribute of the relay device includes the second required session attribute.

After being selected as the target relay device of the remote device, the relay device may further receive the second message from the remote device. The target relay device determines whether the second required session attribute is allowed, and responds to the second message. If the remote device determines that the target relay device allows the second required session attribute, the remote device may transmit, by using the target relay device, a service corresponding to the second required session attribute. That is, the target relay device may be configured to provide a relay service for both a service corresponding to the first required session attribute of the remote device and the service corresponding to the second required session attribute of the remote device. This reduces a procedure of searching for an appropriate relay device for the service corresponding to the second required session attribute, and reduces signaling overheads.

In some possible implementations, the response message of the first message includes another session attribute in addition to the first required session attribute in the allowed session attribute of the relay device.

The relay device includes, in the response message, the another session attribute in addition to the first required session attribute in the allowed session attribute of the relay device, so that the remote device can select the target relay device based on the another session attribute, to further find more appropriate relay devices for different sessions, and to improve communication efficiency.

According to a third aspect, a communication method is provided. The method includes: A remote device receives first information, where the first information includes an allowed session attribute of a relay device or identification information of the allowed session attribute of the relay device. The remote device determines a target relay device of the remote device based on the first information and a first required session attribute of the remote device, where the target relay device is configured to provide a relay service for the remote device.

The remote device can determine whether the relay device can be the target relay device of the remote device based on the first information that includes the allowed session attribute of the relay device or the identification information of the allowed session attribute of the relay device and that is sent by the relay device and the first required session attribute of the remote device. In this way, the remote device can select a more appropriate relay device, to improve communication efficiency.

In some possible implementations, that the remote device determines a target relay device of the remote device based on the first information and a first required session attribute of the remote device includes: When an allowed session attribute of only one relay device includes the first required session attribute, the remote device determines the relay device as the target relay device; or when allowed session attributes of at least two relay devices include the first required session attribute, the remote device selects the target relay device from the at least two relay devices.

When allowed session attributes of a plurality of relay devices include the first required session attribute, the remote device can select a more appropriate relay device as the target relay device. In this way, the remote device can further select an appropriate relay device, to improve communication efficiency.

In some possible implementations, the first information further includes another session attribute in addition to the first required session attribute in the allowed session attribute of the relay device, and that the remote device selects the target relay device from the at least two relay devices includes: The remote device determines the target relay device based on other session attributes of the at least two relay devices.

When allowed session attributes of a plurality of relay devices include the first required session attribute, the remote device can select the target relay device based on other session attributes of the plurality of relay devices, to improve communication efficiency.

In some possible implementations, the method further includes: The remote device sends a request message, where the request message is used to request the allowed session attribute of the relay device, and that a remote device receives first information includes: The remote device receives a response message of the request message, where the response message of the request message includes the first information.

The relay device can send the first information to the remote device only when the remote device has a requirement. This avoids wastes caused because the relay device sends the first information when the remote device has no requirement, thereby reducing resource wastes.

In some possible implementations, the first required session attribute includes at least one of required slice information, data network information, an access type, or a session type.

In some possible implementations, the identification information of the allowed session attribute has a mapping relationship with the allowed session attribute, and the method further includes: The remote device determines the allowed session attribute of the relay device based on the mapping relationship and the identification information of the allowed session attribute of the relay device.

The relay device can determine the allowed session attribute by using the identification information of the allowed session attribute and the mapping relationship. Compared with directly sending the allowed session attribute, this method reduces resource overheads of the relay device.

In some possible implementations, the identification information of the allowed session attribute includes a group identifier ID or a relay service code of the relay device.

The relay device can reuse the group ID or the relay service code to indicate the allowed session attribute. Compared with directly sending the allowed session attribute, this method reduces the resource overheads.

According to a fourth aspect, a communication method is provided. The method includes: A relay device obtains first information, where the first information includes an allowed session attribute of the relay device or identification information of the allowed session attribute of the relay device. The relay device sends the first information to a remote device.

The relay device obtains the first information including the allowed session attribute of the relay device or the identification information of the allowed session attribute, and sends the first information to the remote device. In this way, the remote device can determine, by using the first information and a required session attribute of the remote device, whether the relay device can be a target relay device of the remote device. That is, the remote device can select a more appropriate relay device, to improve communication efficiency.

In some possible implementations, the method further includes: The relay device receives a request message, where the request message is used to request the allowed session attribute of the relay device. That the relay device sends the first information to a remote device includes: The relay device sends a response message of the request message to the remote device, where the response message of the request message includes the first information.

The relay device can send the first information to the remote device only when the remote device has a requirement. This avoids wastes caused because the relay device sends the first information when the remote device has no requirement, thereby reducing resource wastes.

In some possible implementations, the identification information of the allowed session attribute has a mapping relationship with the allowed session attribute.

The relay device can determine the allowed session attribute by using the identification information of the allowed session attribute and the mapping relationship. Compared with directly sending the allowed session attribute, this method reduces resource overheads of the relay device.

In some possible implementations, the identification information of the allowed session attribute includes a group identifier ID or a relay service code of the relay device.

The relay device can reuse the group ID or the relay service code to indicate the allowed session attribute. Compared with directly sending the allowed session attribute, this method reduces the resource overheads.

According to a fifth aspect, a communication apparatus is provided. The apparatus may be a remote device or a chip in the remote device. The apparatus has a function of implementing the first aspect and the possible implementations thereof. The function may be implemented by hardware, or may be implemented by hardware executing corresponding software. The hardware or software includes one or more modules corresponding to the function.

In a possible design, the apparatus includes a transceiver module. Optionally, the apparatus further includes a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the communication method according to the first aspect and the possible implementations thereof. In this design, the apparatus may be the remote device.

In another possible design, when the apparatus is the chip, the chip includes a transceiver module. Optionally, the apparatus further includes a processing module. The transceiver module may be, for example, an input/output interface, a pin, or a circuit on the chip. The processing module may be, for example, a processor. The processing module may execute instructions, to enable the chip in the remote device to perform the communication method according to the first aspect and the possible implementations thereof. Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory RAM).

Any processor mentioned above may be a general-purpose central processing unit (CPU), a microprocessor, an application-specific integrated circuit (ASIC), or one or more integrated circuits configured to control program execution of the communication methods according to the foregoing aspects.

According to a sixth aspect, a communication apparatus is provided. The apparatus may be a relay device or a chip in the relay device. The apparatus has a function of implementing the second aspect and the possible implementations thereof. The function may be implemented by hardware, or may be implemented by hardware executing corresponding software. The hardware or software includes one or more modules corresponding to the function.

In a possible design, the apparatus includes a transceiver module. Optionally, the apparatus further includes a processing module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the method according to the second aspect or the possible implementations thereof.

In another possible design, when the apparatus is the chip, the chip includes a transceiver module. Optionally, the apparatus further includes a processing module. The transceiver module may be, for example, an input/output interface, a pin, or a circuit on the chip. The processing module may be, for example, a processor. The processing module may execute instructions, to enable the chip in the relay device to perform the communication method according to the second aspect and the possible implementations thereof.

Optionally, the processing module may execute instructions in a storage module, and the storage module may be a storage module in the chip, for example, a register or a buffer. The storage module may alternatively be located inside a communication device but outside the chip, for example, a ROM or another type of static storage device that can store static information and instructions, or a RAM.

Any processor mentioned above may be a CPU, a microprocessor, an application-specific integrated circuit (ASIC), or one or more integrated circuits configured to control program execution of the communication methods according to the foregoing aspects.

According to a seventh aspect, a communication apparatus is provided. The apparatus may be a remote device or a chip in the remote device. The apparatus has a function of implementing the third aspect and the possible implementations thereof. The function may be implemented by hardware, or may be implemented by hardware executing corresponding software. The hardware or software includes one or more modules corresponding to the function.

In a possible design, the apparatus includes a transceiver module and a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the communication method according to the third aspect and the possible implementations thereof. In this design, the apparatus may be the remote device.

In another possible design, when the apparatus is the chip, the chip includes a transceiver module and a processing module. The transceiver module may be, for example, an input/output interface, a pin, or a circuit on the chip. The processing module may be, for example, a processor. The processing module may execute instructions, to enable the chip in the remote device to perform the communication method according to the third aspect and the possible implementations thereof. Optionally, the processing module may execute instructions in a storage module, and the storage module may be a storage module in the chip, for example, a register or a buffer. The storage module may alternatively be located inside a communication device but outside the chip, for example, a ROM or another type of static storage device that can store static information and instructions, or a RAM.

Any processor mentioned above may be a CPU, a microprocessor, an ASIC, or one or more integrated circuits configured to control program execution of the communication methods in the foregoing aspects.

According to an eighth aspect, a communication apparatus is provided. The apparatus may be a relay device or a chip in the relay device. The apparatus has a function of implementing the fourth aspect and the possible implementations thereof. The function may be implemented by hardware, or may be implemented by hardware executing corresponding software. The hardware or software includes one or more modules corresponding to the function.

In a possible design, the apparatus includes a transceiver module. Optionally, the apparatus further includes a processing module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the method according to the fourth aspect or the possible implementations thereof.

In another possible design, when the apparatus is the chip, the chip includes a transceiver module. Optionally, the apparatus further includes a processing module. The transceiver module may be, for example, an input/output interface, a pin, or a circuit on the chip. The processing module may be, for example, a processor. The processing module may execute instructions, to enable the chip in the relay device to perform the communication method according to the fourth aspect and the possible implementations thereof.

Optionally, the processing module may execute instructions in a storage module, and the storage module may be a storage module in the chip, for example, a register or a buffer. The storage module may alternatively be located inside a communication device but outside the chip, for example, a ROM or another type of static storage device that can store static information and instructions, or a RAM.

Any processor mentioned above may be a CPU, a microprocessor, an ASIC, or one or more integrated circuits configured to control program execution of the communication methods in the foregoing aspects.

According to a ninth aspect, a computer storage medium is provided. The computer storage medium stores program code, and the program code is used to indicate instructions for performing the method according to the first aspect and the possible implementations thereof.

According to a tenth aspect, a computer storage medium is provided. The computer storage medium stores program code, and the program code is used to indicate instructions for performing the method according to the second aspect and the possible implementations thereof.

According to an eleventh aspect, a computer storage medium is provided. The computer storage medium stores program code, and the program code is used to indicate instructions for performing the method according to the third aspect and the possible implementations thereof.

According to a twelfth aspect, a computer storage medium is provided. The computer storage medium stores program code, and the program code is used to indicate instructions for performing the method according to the fourth aspect and the possible implementations thereof.

According to a thirteenth aspect, a computer program product including instructions is provided. When the computer program product runs on a computer, the computer is enabled to perform the method according to the first aspect or the possible implementations thereof.

According to a fourteenth aspect, a computer program product including instructions is provided. When the computer program product runs on a computer, the computer is enabled to perform the method according to the second aspect or the possible implementations thereof.

According to a fifteenth aspect, a computer program product including instructions is provided. When the computer program product runs on a computer, the computer is enabled to perform the method according to the third aspect or the possible implementations thereof.

According to a sixteenth aspect, a computer program product including instructions is provided. When the computer program product runs on a computer, the computer is enabled to perform the method according to the fourth aspect or the possible implementations thereof.

According to a seventeenth aspect, a communication system is provided. The communication system includes the apparatus according to the fifth aspect and the apparatus according to the sixth aspect.

According to an eighteenth aspect, a communication system is provided. The communication system includes the apparatus according to the seventh aspect, and the apparatus according to the eighth aspect.

Based on the foregoing technical solutions, the remote device obtains the first required session attribute or the identification information of the first required session attribute, and sends the first message including the first required session attribute or the identification information of the first required session attribute. In this way, the relay device may determine, based on the first message, whether the relay device can be a relay device of the remote device, to help the remote device select a relay device satisfying a required session attribute, and to help improve communication efficiency.

DESCRIPTION OF EMBODIMENTS

Figure 1:
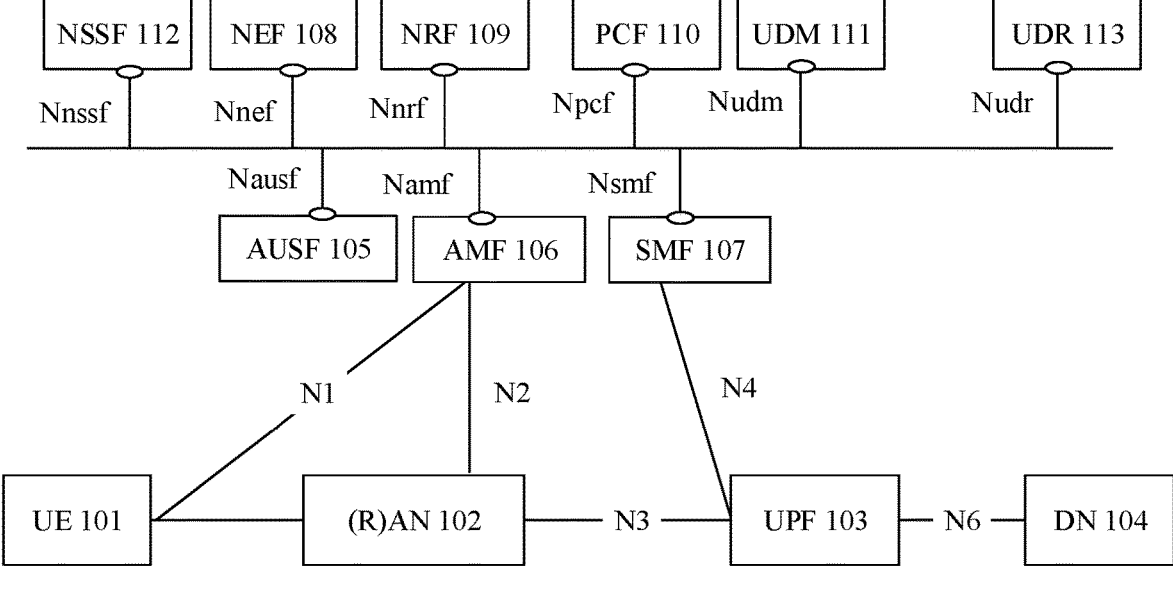
FIG. 1 is a schematic diagram of a possible network architecture according to an embodiment of this application.

The following describes technical solutions of this application with reference to accompanying drawings.

The technical solutions of embodiments of this application may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communication system, a future 5th generation (5G) communication system, or a future new radio (NR) communication system.

A remote device in embodiments of this application may be a terminal, user equipment (UE), an access terminal, a user unit, a user station, a mobile station, a mobile console, a remote station, a remote terminal, a mobile device, a user terminal, a terminal, a radio communication device, a user agent, a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile communication network (PLMN), or the like. This is not limited in embodiments of this application. For ease of description, the "terminal" and the "remote device" are not distinguished in the following embodiments.

An access network device in embodiments of this application may be a device configured to communicate with the terminal. The access network device may be a base transceiver station (BTS) in the global system for mobile communications GSM or the CDMA system, a NodeB (NB) in the WCDMA system, an evolved NodeB (eNB or eNodeB) in the LTE system, or a radio controller in a cloud radio access network (CRAN) scenario. Alternatively, the access network device may be a relay station, an access point, a vehicle-mounted device, a wearable device, an access network device in a future 5G network, or an access network device in a future evolved PLMN network, one or a group of antenna panels (including a plurality of antenna panels) of a base station in a 5G system, or a network node that forms a gNB or a transmission point, for example, a baseband unit (BBU) or a distributed unit (DU). This is not limited in embodiments of this application.

In some deployment, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be an access network device in an access network (RAN), or may be an access network device in a core network (CN). This is not limited in this application.

In embodiments of this application, the terminal or the access network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code for the method provided in embodiments of this application can be run to perform communication according to the method provided in embodiments of this application. For example, the execution body of the method provided in embodiments of this application may be the terminal or the access network device, or a functional module that is in the terminal or the access network device and that can invoke and execute the program.

In addition, aspects or features of this application may be implemented as a method, an apparatus or a product that uses standard programming and/or engineering technologies. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

FIG. 1 is a schematic diagram of a possible network architecture according to an embodiment of this application. A 5G network architecture is used as an example. The network architecture includes a terminal 101, a (radio) access network device ((R)AN) 102, a user plane function (UPF) network element 103, a data network (DN) network element 104, an authentication server function (AUSF) network element 105, an AMF network element 106, a session management function (SMF) network element 107, a network exposure function (NEF) network element 108, a network repository function (NRF) network element 109, a policy control function (PCF) network element 110, a unified data management (UDM) network element 111, and an NSSF network element 112. In the following descriptions, the UPF network element 103, the DN network element 104, the AUSF network element 105, the AMF network element 106, the SMF network element 107, the NEF network element 108, the NRF network element 109, the policy control function (PCF) network element 110, the UDM network element 111, the NSSF network element 112 are briefly referred to as a UPF 103, a DN 104, an AUSF 105, an AMF 106, an SMF 107, an NEF 108, an NRF 109, a PCF 110, a UDM 111, an NSSF 112, and a unified data repository (UDR) 113.

The terminal 101 accesses a 5G network and obtains a service mainly through a radio air interface. The terminal interacts with the RAN through an air interface, and interacts with the AMF of a core network by using non-access stratum (NAS) signaling. The RAN 102 is responsible for scheduling an air interface resource for the terminal to access a network and responsible for air interface connection management. The UPF 103 is responsible for forwarding and receiving of user data in the terminal. For example, the UPF may receive user data from a data network, and transmit the user data to the terminal by using an access network device. Alternatively, the UPF may receive user data from the terminal by using an access network device, and forward the user data to a data network. A transmission resource and a scheduling function in the UPF 103 that provide a service for the terminal are managed and controlled by the SMF network element. The AUSF 105 is a core network control plane network element, and is mainly responsible for authenticating and authorizing a user to ensure that the user is an authorized user. The AMF 106 is a core network element, and is mainly responsible for signaling processing, for example, functions such as access control, mobility management, attachment and detachment, and gateway selection. In addition, when providing a service for a session in the terminal, the AMF 106 may further provide control plane storage resources for the session, to store a session identifier, an SMF network element identifier related to the session identifier, and the like. The SMF 107 is responsible for user plane network element selection, user plane network element redirection, internet protocol (IP) address allocation, bearer establishment, modification and release, and quality of service (QoS) control. The NEF 108 is a core network control plane network element, and is responsible for opening a mobile network capability. The NRF 109 is a core network control plane network element, and is responsible for dynamic registration of a service capability of a network function and network function discovery. The PCF 110 mainly supports providing a unified policy framework to control network behavior, and providing a policy rule for a control layer network function, and is responsible for obtaining policy decision-related subscription information of a user. The UDM 111 is a core network control plane network element and a home subscriber server. The UDM may be used for unified data management, and supports functions such as 3GPP authentication, user identity operation, permission granting, registration, and mobility management. The NSSF 112 is configured to complete a network slice selection function for the terminal. The NSSF 112 is a core network control plane entity, and is responsible for selecting a target NSI. The UDR 113 is responsible for storing and providing terminal subscription data, or storing and providing terminal policy data.

In the network architecture, Nausf is a service-based interface presented by the AUSF 105, Namf is a service-based interface presented by the AMF 106, Nsmf is a service-based interface presented by the SMF 107, Nnef is a service-based interface presented by the NEF 108, Nnrf is a service-based interface presented by the NRF 109, Npcf is a service-based interface presented by the PCF 110, Nudm is a service-based interface presented by the UDM 111, Nnssf is a service-based interface presented by NSSF 112, and Nudr is a service-based interface presented by the UDR 113. N1 is a reference point between the UE 101 and the AMF 106. N2 is a reference point between the (R)AN 102 and the AMF 106, and is used for sending a non-access stratum (NAS) message and the like. N3 is a reference point between the (R)AN 102 and the UPF 103, and is used for transmitting user plane data and the like. N4 is a reference point between the SMF 107 and the UPF 103, and is used for transmitting information such as N3-connection tunnel identifier information, data buffer indication information, and a downlink data notification message. The N6 interface is a reference point between the UPF 103 and the DN 104, and is used for transmitting user plane data and the like.

Figure 2:
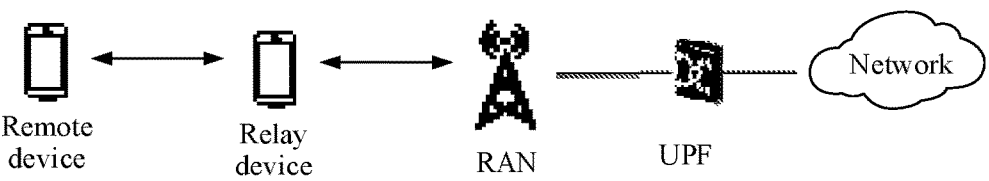
FIG. 2 is a schematic diagram of an architecture of another communication system according to an embodiment of this application.

FIG. 2 is a schematic diagram of an architecture of another communication system according to an embodiment of this application. When a remote device is located outside a network coverage area or quality of signals between the remote device and an access network device is poor (for example, lower than a preset threshold), the remote device may be assisted by a relay device. Communication between the remote device and the access network device is implemented through communication between the remote device and the relay device and communication between the relay device and the access network device. For example, as shown in FIG. 2, the remote device may communicate with a RAN by using a relay terminal.

It may be understood that the relay device in this embodiment of this application may be a terminal (namely, a relay terminal), an access network device (namely, a RAN), or a roadside unit. This is not limited.

The following describes terms used in this application.

1. Session Attribute:

In a 5G network, a terminal may access a data network by creating a protocol data unit (PDU) session. For example, the terminal may create a plurality of PDU sessions to access different data networks. Each PDU session has a corresponding attribute that may be referred to as a session attribute. Specifically, the session attribute may include at least one of slice information, data network information, a session type (PDU session type), a session and service continuity mode (SSC mode), and an access type.

The slice information may be used to identify a slice. For example, the slice information is single network slice selection assistance information (S-NSSAI). The S-NSSAI includes a slice service type (SST) and a slice differentiator (SD). The SST is determined by a slice feature, and may be specifically classified into enhanced mobile broadband (eMBB), MIoT, ultra-reliable low-latency communication (URLLC), V2X, and the like. The SD is used to distinguish a plurality of slices of a same SST. NSSAI is a set of a plurality of pieces of S-NSSAI. One piece of network slice selection assistance information (NSSAI) may include eight pieces of S-NSSAI. Specifically, the slice information may include a slice identifier and a PLMN identifier. In this case, slices in different PLMNs may use a same slice identifier. For example, the slice information may include PLMN 1 and slice 1, or PLMN 2 and slice 1.

The data network information may be used to identify a data network (DN). For example, the data network information is a data network name (DNN). The DN may be an internet, or may be an enterprise private network. This is not limited in this application.

The DN may be an internet, or may be an enterprise private network. This is not limited in this application.

The session type may include types such as IPv4, IPv6, IPv4IPv6, Ethernet, or unstructured.

The session continuity mode may include SSC mode 1, SSC mode 2, SSC mode 3, or the like. SSC mode 1 may be that a network maintains continuity of a service provided for the terminal. SSC mode 2 may be that the network releases a service connection to the terminal and a corresponding PDU session. SSC mode 3 may be that a new PDU session connection is established before an original connection is terminated.

The access type may be 3GPP access or non-3GPP access. This is not limited.

It should be noted that an allowed session attribute is at least one of allowed slice information, allowed data network information, an allowed session type, an allowed session continuity mode, and an allowed access type. For example, an allowed session attribute of a relay device is a session attribute allowed by the relay device, and an allowed session attribute of a remote device is a session attribute allowed by the remote device.

2. Allowed Slice:

The allowed slice may be understood as a slice allowed to be used. For example, the allowed slice is a slice allowed to be used by a terminal or a slice allowed to be used by an AMF. The slice allowed to be used by a terminal may be referred to as an allowed slice of the terminal, and the slice allowed to be used by an AMF may be referred to as an allowed slice of the AMF.

Specifically, the allowed slice of the terminal may be a slice that can be used when the terminal establishes a PDU session, or some or all of subscribed slices of the terminal. The subscribed slice is a slice in subscription information, and may be identified by using subscribed S-NSSAI.

It may be understood that allowed slice information may be used to indicate the allowed slice. For example, the allowed slice may be identified by using allowed network slice selection assistance information (allowed NSSAI). Specifically, in a registration procedure, a network side may provide a terminal with authorized NSSAI, to identify an allowed slice of the terminal.

3. Configured Slice:

A slice indicated by configured slice information may be referred to as a configured slice. The configured slice information may be preconfigured in a terminal or indicated by an AMF to a terminal in a registration procedure. If the configured slice information is indicated by the AMF to the terminal, a configured slice indicated by the configured slice information is a slice supported by a PLMN serving the terminal. The configured slice is mainly used by the terminal to request authorization from a network device. When the authorization succeeds, the configured slice may be an allowed slice. The configured slice may be indicated by using configured network slice selection assistance information (configured NSSAI).

It should be noted that "allowed" may mean "allowed" by a network side or "allowed" by an operator. For example, if a terminal subscribes to a slice, it indicates that the terminal is allowed to use the slice. This is not limited.

An allowed slice of an AMF may be understood as a slice allowed to be used by the AMF, and an allowed slice of a terminal may be understood as a slice allowed to be used by the terminal.

4. UE Route Selection Policy (URSP):

The URSP may include a correspondence between an application identifier (app ID) and a session attribute. An application may be a vehicle to everything application, or may be an internet of things application. This is not limited. In addition, the session attribute in the correspondence may be a subscribed session attribute of a terminal device.

The URSP may be used to determine a route path of an application data flow, for example, a PDU session to which the application data flow is routed. The URSP may be further used by an application to determine a session attribute of a PDU session used to transmit data of the application.

Specifically, the URSP may be preset in a terminal, or may be sent by a PCF to the terminal by using an AMF. The terminal may preferentially select an URSP delivered by a network device.

5. Subscribed Session Attribute:

The subscribed session attribute may be a session attribute in subscription information. For example, if a terminal subscribes to a session attribute, namely, a subscribed session attribute of the terminal, it indicates that the terminal can use the session attribute. The subscribed session attribute may include at least one of a subscribed slice, a subscribed data network, a subscribed session type, a subscribed session continuity mode, and a subscribed access type.

The subscribed slice is a slice in the subscription information. For example, if a terminal subscribes to a slice, namely, a subscribed slice of the terminal, it indicates that the terminal can use the slice. The subscribed slice may be indicated by using subscribed network slice selection assistance information (subscribed NSSAI).

6. Allowed Session Attribute:

The allowed session attribute may be an allowed session attribute of a terminal (for example, a remote device or a relay device), that is, a session attribute allowed to be used by the terminal, or an attribute to which a session of the terminal is allowed to be set. For example, the allowed session attribute may be a session attribute corresponding to subscription information of the remote device or subscription information of the relay device, may be a session attribute authorized to be used by the remote device or the relay device, or may be an allowed session attribute of the remote device or the relay device at a current registration location.

7. Required Session Attribute:

The required session attribute may be a session attribute required by a terminal (for example, a remote device). For example, the required session attribute may be a session attribute required by the remote device to satisfy a requirement of transmitting data to a network, or may be a session attribute required to satisfy an application requirement of the remote device. The required session attribute may be determined by the remote device based on the application requirement and a URSP, or may be determined by the remote device based on a subscribed session attribute. Details are not described herein.

In a conventional solution, a terminal may send a discovery message carrying a relay service code to request to discover a relay device. The relay service code is used to indicate that the terminal requires a connection service provided by the relay device. A relay device that receives the discovery message determines, based on whether a connection service provided by the relay device satisfies the connection service required by the terminal, whether to send a response message of the discovery message. If the connection service provided by the relay device can satisfy the connection service required by the terminal, the relay device sends the response message of the discovery message to the terminal. If the connection service provided by the relay device cannot satisfy the connection service required by the terminal, the relay device does not send the response message. The terminal may select the relay device that sends the response message, to perform a relay service.

However, in the conventional solution, appropriate relay devices cannot be selected for different session requirements of the terminal. Consequently, a selected relay device cannot satisfy a session requirement of the remote device.

Figures 3, 4:
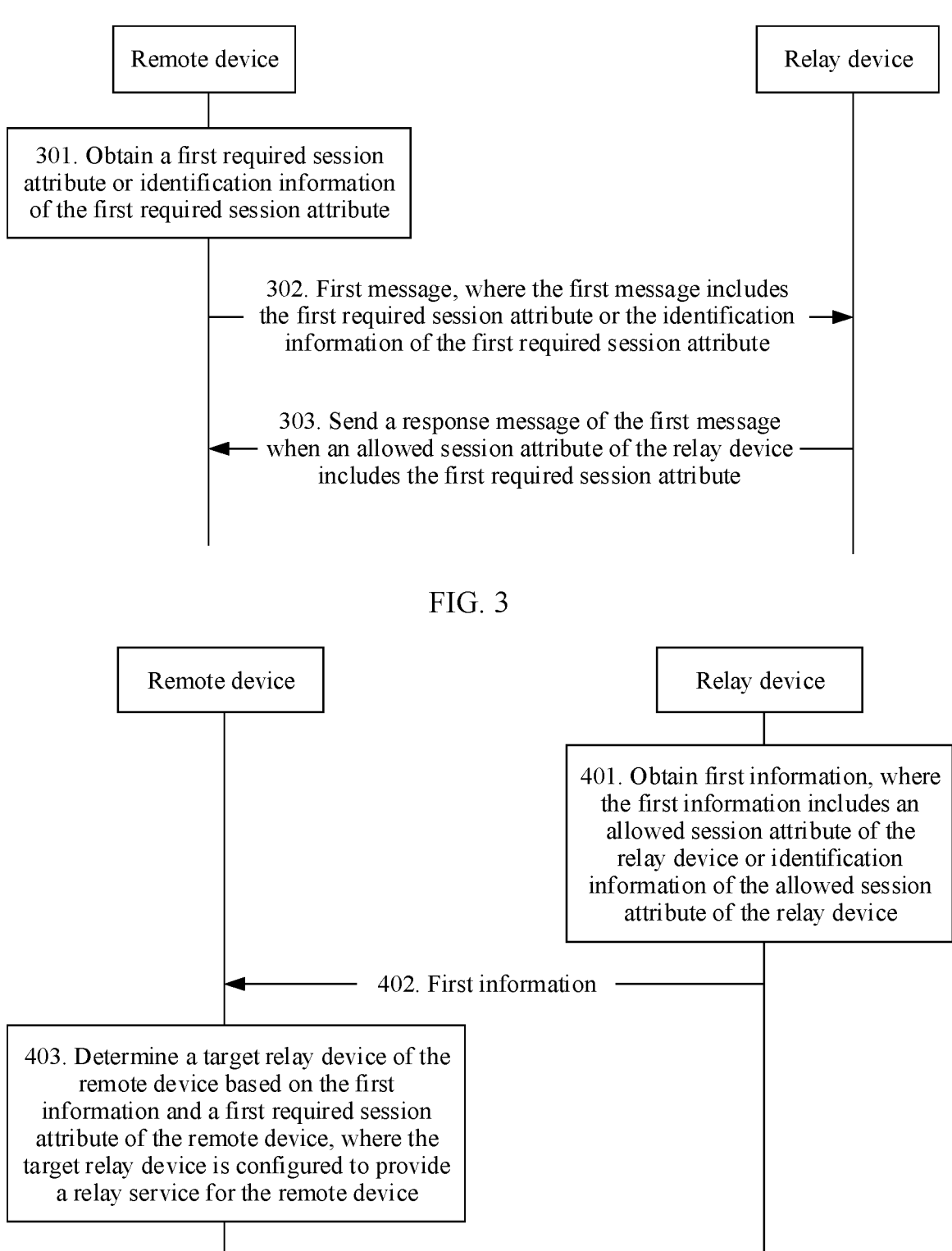
FIG. 3 is a schematic flowchart of a communication method according to an embodiment of this application.
FIG. 4 is a schematic flowchart of a communication method according to another embodiment of this application.

FIG. 3 is a schematic flowchart of a communication method according to an embodiment of this application.

301. A remote device obtains a first required session attribute or identification information of the first required session attribute.

Specifically, the remote device may learn required session attributes of one or more sessions, or identification information of the required session attributes. The identification information of the required session attribute may be used to identify the required session attribute.

The first required session attribute may be used as a session attribute of a first session that is to be established or needs to be established by the remote device. This is not limited.

It may be understood that the remote device may be configured to transmit different services by using one or more session connections. This is not limited in this application.

It may be further understood that before step 301, the remote device may perform registration in advance. To be specific, the remote device performs signaling exchange with an AMF and a UDM, to obtain an allowed slice, a configured slice, a URSP, and the like that are of the remote device. The URSP is used by the remote device to select or establish corresponding sessions for different services (or different applications).

Optionally, the first required session attribute includes at least one of required slice information, data network information, a session type, a session continuity mode, or an access type.

The required slice information in the first required session attribute may be used to indicate a slice required by the remote device, a requirement of the remote device for a slice, a slice requested by the remote device, or a required slice of the remote device. That is, the required slice information may be used to indicate a required slice of the remote device, for example, indicate a slice of a PLMN. Specifically, the required slice information may include a slice identifier and a PLMN identifier. In this case, slices in different PLMNs may use a same slice identifier. For example, the required slice information may include PLMN 1 and slice 1, or PLMN 2 and slice 1.

Specifically, the first required session attribute may include only the required slice information, or include only the data network information, or include only the session type, or include only the session continuity mode, or include only the access type. Alternatively, the first required session attribute may include at least two of the foregoing five items. For example, the first required session attribute includes the required slice information and the data network information, or the first required session attribute includes the required slice information and the session type, or the first required session attribute includes the data network information and the session type, or the first required session attribute includes the required slice information, the data network information, and the session type, or the first required session attribute includes the required slice information and the session continuity mode.

It may be understood that the required slice may be one or more slices of the allowed slice of the remote device or the configured slice of the remote device. This is not limited.

Optionally, the identification information of the first required session attribute is used to identify the first required session attribute, and may include a group identifier (ID) or a relay service code of the remote device.

Specifically, the group identifier of the remote device may be used to indicate a group to which the remote device belongs. For example, terminals having a same capability or terminals having a same application service may be added to a same group, that is, use a same group ID. That is, the group ID may be at a granularity of a remote device, or may be at a granularity of an application.

It may be understood that terminals having a same capability may be understood as terminals having a same vehicle to everything (V2X) capability or an internet of things (IOT) capability.

Optionally, the identification information of the first required session attribute has a mapping relationship with the first required session attribute.

Specifically, the remote device may learn, based on the mapping relationship, the identification information corresponding to the first required session attribute. For example, if the identification information of the first required session attribute is the group ID of the remote device, the mapping relationship may be a correspondence between the group ID and the session attribute. If the identification information of the first required session attribute is the relay service code, the mapping relationship is a correspondence between the relay service code and the session attribute.

It may be understood that the mapping relationship may include one correspondence, or may include a plurality of correspondences. This is not limited in this application. In addition, in the correspondence between the group ID and the first required session attribute, one group ID may correspond to one first required session attribute, or one group ID may correspond to a plurality of first required session attributes, or a plurality of IDs may correspond to one first required session attribute. Correspondingly, in the correspondence between the relay service code and the first required session attribute, one relay service code may correspond to one first required session attribute, or one relay service code may correspond to a plurality of first required session attributes, or a plurality of relay service codes may correspond to one first required session attribute.

Optionally, the mapping relationship may be obtained by the remote device from a UDM, a PCF, or a proximity service function (ProSe Function). The PCF or the ProSe function is used to store and deliver a parameter related to D2D discovery or communication. The PCF is a control plane network element, and the ProSe function is a data plane network element.

Optionally, when the first required session attribute includes the required slice information, the method further includes: The PCF or the ProSe function may obtain subscribed information of the remote device from a UDR, where the subscribed information may include subscribed slice information (or allowed slice information), the PCF or the ProSe function may generate a mapping relationship between the subscribed slice information (or the allowed slice information) and the relay service code, and send the mapping relationship between the subscribed slice information (or the allowed slice information) and the relay service code to the remote device. That is, slice information in the mapping relationship is slice information that the remote device has subscribed to.

302. The remote device sends a first message, where the first message includes the first required session attribute or the identification information of the first required session attribute.

Specifically, the remote device may broadcast the first message. Correspondingly, a relay device receives the first message.

It may be understood that the first message may be a session request message or a discovery request message.

For example, the remote device may send the session request message when the remote device is not within a range of a network service, that is, cannot directly communicate with a network device. Alternatively, the remote device sends the session request message when quality of communication between the remote device and a network device is poor.

303. The relay device sends a response message of the first message to the remote device when an allowed session attribute of the relay device includes the first required session attribute.

Correspondingly, the remote device receives the response message of the first message.

The response message of the first message may be used to indicate that the allowed session attribute of the relay device includes the first required session attribute (that is, the relay device is allowed to use the first required session attribute, or the relay device supports the first required session attribute).

For example, if the first message includes the identification information of the first required session attribute, the relay device may determine the first required session attribute based on the identification information and the mapping relationship. Further, the relay device determines whether the allowed session attribute of the relay device includes the first required session attribute.

In a possible implementation of step 303, if the allowed session attribute of the relay device includes the first required session attribute, the relay device sends the response message of the first message to the remote device. Alternatively, if the allowed session attribute of the relay device does not include the first required session attribute, the relay device does not send the response message of the first message.

In another possible implementation of step 303, if the allowed session attribute of the relay device includes the first required session attribute, the response message of the first message is used to indicate that the allowed session attribute of the relay device includes the first required session attribute (that is, the relay device is allowed to use the first required session attribute). If the allowed session attribute of the relay device does not include the first required session attribute, the response message of the first message is used to indicate that the allowed session attribute of the relay device does not include the first required session attribute (that is, the relay device is not allowed to use the first required session attribute).

In this embodiment of this application, the relay device may determine, based on the first message that is sent by the remote device and that includes the first required session attribute or the identification information of the first required session attribute, whether the relay device can be a relay device of the remote device. This helps the remote device select a relay device satisfying a required session attribute, and helps improve communication efficiency.

It may be understood that there may be one or more relay devices mentioned in the foregoing embodiment. For example, the remote device may send the first message to a plurality of relay devices, and a relay device (which may also be subsequently referred to as a candidate relay device) that can satisfy the first required session attribute in the relay devices that receive the first message sends the response message of the first message to the remote device. There may be one or more candidate relay devices. Correspondingly, the remote device may receive one or more response messages of the first message. This is not limited.

It may be further understood that the response message of the first message may carry only an identifier of the first message. In this way, the remote device may learn, based on the identifier of the first message, that the response message is the response message of the first message.

Optionally, the response message may further indicate that the allowed session attribute of the relay device that sends the response message includes the first required session attribute, that is, the response message may be considered as indication information of the relay device. The response message indicates that the session attribute of the first session is allowed by the relay device. This may specifically mean: the response message includes the first required session attribute. Alternatively, the response message may indicate, in another manner, only whether the session attribute of the first session is allowed. For example, if a value of a bit in the response message is "1", it indicates that the session attribute of the first session is allowed by the relay device. If a value of the bit is "0", it indicates that the session attribute of the first session is not allowed by the relay device.

It may be further understood that the relay device may perform registration in advance before step 303. To be specific, the relay device performs signaling exchange with the AMF and the UDM, to obtain the allowed slice, the configured slice, the UE route selection policy (URSP), and the like that are allowed by the relay device. The URSP is used by the remote device to select corresponding sessions for different services (or different applications).

It may be further understood that when the first required session attribute includes the required slice information, the method may further include: The PCF or the ProSe function may obtain subscribed information of the relay device from a UDR, where the subscribed information may include subscribed slice information (or allowed slice information), the PCF or the ProSe function generates a correspondence between the subscribed slice information (or allowed slice information) and the relay service code, and send the correspondence between the subscribed slice information (or the allowed slice information) and the relay service code to the relay device.

Optionally, in an implementation scenario of the foregoing embodiment, the method further includes:

The remote device receives a response message that is of the first message and that is from a candidate relay device, where an allowed session attribute of the candidate relay device includes the first required session attribute.

The remote device determines a target relay device of the remote device based on the response message of the candidate relay device, where the target relay device is configured to provide a relay service for the remote device.

Specifically, when receiving the response message of the first message, the remote device may determine a relay device that sends the response message as the target relay device. In this way, the remote device can communicate with a network device by using the target relay device, to find appropriate relay devices for different sessions, and to improve communication efficiency.

Further, optionally, the candidate relay device includes at least two relay devices, and the response message further includes another session attribute in addition to the first required session attribute in the allowed session attribute of the candidate relay device. That the remote device determines a target relay device of the remote device based on the response message of the candidate relay device includes: The remote device determines the target relay device based on the another session attribute of the candidate relay device.

Specifically, if the remote device receives at least two response messages of the first message, that is, allowed session attributes of at least two relay devices include the first required session attribute, the remote device may select one relay device from the at least two relay devices as the target relay device. In this way, the remote device can communicate with a network device by using the target relay device, to find appropriate relay devices for different sessions, and to improve communication efficiency.

It may be understood that the remote device may select the target relay device from the at least two relay devices based on channel quality. For example, the remote device may select a relay device with best channel quality as the target relay device.

Optionally, the response message of the first message may further include another session attribute in addition to the first required session attribute in the allowed session attribute of the relay device. In this way, the remote device may select the target relay device based on the another session attribute in each response message.

Specifically, each response message of the first message corresponds to one relay device, that is, different response messages are from different relay devices. For example, a first response message of the first message includes another session attribute in addition to the first required session attribute in an allowed session attribute of a first relay device. The first response message is sent by the first relay device. That is, the remote device may select the target relay device based on the another session attribute in each response message. For example, the remote device selects, as the target relay device, a relay device corresponding to a response message that includes a plurality of types of other session attributes, or may select, as the target relay device, a relay device corresponding to a response message that includes a type of session attribute that is required.

It may be understood that the response message of the first message may include the first required session attribute, or may not include the first required session attribute.

Optionally, in an implementation scenario of the foregoing embodiment, the method further includes the following steps:

The remote device sends a second message to the target relay device, where the second message includes a second required session attribute of the remote device or identification information of the second required session attribute.

The relay device sends a response message of the second message when the allowed session attribute of the relay device includes the second required session attribute.

Specifically, the second required session attribute is different from the first required session attribute. If the remote device requires a plurality of required session attributes, after selecting one target relay device for the first required session attribute, the remote device may further determine whether a current target relay device can be used as a relay device of the second required session attribute. The remote device sends the second message to the target relay device, and the target relay device determines whether the second required session attribute is allowed, and responds to the second message. If the remote device determines that the target relay device allows the second required session attribute, the remote device may transmit, by using the target relay device, a service corresponding to the second required session attribute. That is, the target relay device may be configured to provide a relay service for both a service corresponding to the first required session attribute of the remote device and the service corresponding to the second required session attribute of the remote device. This reduces a procedure of searching for an appropriate relay device for the service corresponding to the second required session attribute, and reduces signaling overheads.

The target relay device may respond to the second message in the following two manners.

In one manner, if an allowed session attribute of the target relay device includes the second required session attribute, the target relay device sends a response message. Alternatively, if an allowed session attribute of the target relay device does not include the second required session attribute, the target relay device does not send a response message. The response message may be used to identify only a response message corresponding to the second message.

In another manner, if an allowed session attribute of the target relay device includes the second required session attribute, the response message sent by the target relay device is used to indicate that the target relay device is allowed to use the second required session attribute (that is, the target relay device supports the second required session attribute, or the target relay device is allowed to use the second required session attribute). Alternatively, if an allowed session attribute of the target relay device does not include the second required session attribute, the response message sent by the target relay device is used to indicate that the target relay device is not allowed to use the second required session attribute (that is, the target relay device does not support the second required session attribute, or the target relay device is not allowed to use the second required session attribute).

It may be understood that the remote device may further determine whether the target relay device allows another required session attribute, that is, whether the target relay device can provide a relay service for services corresponding to more required session attributes.

It may be further understood that if the second required session attribute is not allowed by the target relay device, the remote device may reselect a target relay device for the second required session attribute, or the remote device may reselect a target relay device that can allow both the first required session attribute and the second required session attribute.

Optionally, in another implementation scenario of the foregoing embodiment, the first required session attribute includes the required slice information, and the method further includes:

When an allowed slice of the relay device includes a first slice indicated by the required slice information, the relay device determines that the allowed session attribute of the relay device includes the first required session attribute.

Specifically, before step 303, that the relay device determines whether the allowed session attribute of the relay device includes the first required session attribute may be specifically that the relay device determines whether the allowed slice includes the first slice indicated by the required slice information included in the first required session attribute. If the relay device determines that the allowed slice includes the first slice, the relay device determines that the allowed session attribute includes the first required session attribute. If the relay device determines that the allowed slice does not include the first slice, the relay device determines that the allowed session attribute does not include the first required session attribute. Each relay device can determine, based on whether an allowed slice of the relay device includes the first slice, whether an allowed session attribute of the relay device includes the first required session attribute, and then determine whether to send the response message of the first message to the remote device, so that the remote device can select, based on the response message of the first message, a relay device satisfying the first required session attribute, to further select a more appropriate relay device, and improve communication efficiency.

It may be understood that if the relay device determines that the allowed slice of the relay device includes the first slice, but the relay device has not established a PDU session corresponding to the first slice, the relay device may initiate establishment of the PDU session.

Optionally, in another implementation scenario of the foregoing embodiment, the first required session attribute includes the required slice information, and the method further includes:

The relay device sends a request message to an access network device when a configured slice of the relay device includes a first slice indicated by the required slice information, where the request message is used to request authorization for the first slice.

The relay device receives a response message of the request message, where the response message of the request message is used to indicate that the first slice is an allowed slice.

The relay device determines, based on the response message, that the allowed session attribute of the relay device includes the first required session attribute.

Specifically, that the relay device determines whether the allowed session attribute of the relay device includes the first required session attribute may be specifically that the relay device determines whether the allowed slice includes the first slice indicated by the required slice information included in the first required session attribute. If the relay device determines that the configured slice includes the first slice, the relay device sends the request message to a network device, where the request message is used to request authorization for the first slice. Specifically, the relay device sends the request message to an AMF, and then the AMF sends the request message to a UDM. The UDM determines whether to authorize the first slice as the allowed slice, or the AMF determines whether to authorize the first slice as the allowed slice. The relay device receives the response message of the request message from the AMF. The response message of the request message is used to indicate whether the first slice is the allowed slice. If the response message of the request message indicates that the first slice is the allowed slice, the relay device determines that the allowed session attribute of the relay device includes the first required session attribute. If the response message indicates that the first slice is not the allowed slice, the relay device does not send the response message of the first message to the remote device.

Optionally, in another implementation scenario of the foregoing embodiment, when the first required session attribute includes the required slice information, and the configured slice of the relay device includes the first slice indicated by the required slice information, the relay device determines that the allowed session attribute includes the first required session attribute.

Specifically, when the relay device determines that the configured slice includes the first slice, the relay device may consider that the allowed session attribute includes the first required session attribute, and send the response message of the first message to the remote device. If the remote device selects the relay device as the target relay device, the relay device requests the network device to authorize the first slice as the allowed slice. For example, the relay device sends the request message to an AMF, and then the AMF sends the request message to a UDM. The UDM determines whether to authorize the first slice as the allowed slice, or the AMF determines whether to authorize the first slice as the allowed slice. If the authorization succeeds, the AMF sends the response message of the request message to the relay device, where the response message of the request message is used to indicate that the first slice is the allowed slice. In this way, the relay device may provide a relay service for the remote device. To be specific, the relay device requests to authorize the first slice only when the relay device is selected by the remote device as the target relay device. If the relay device is not selected as the target relay device, the relay device does not need to request to authorize the first slice, thereby reducing signaling overheads.

Optionally, in another implementation scenario of the foregoing embodiment, step 303 includes:

The relay device sends the response message of the first message to the remote device when a URSP of the relay device includes the first required session attribute.

Specifically, the URSP may be considered as a list including a plurality of session attributes. The relay device may determine, based on whether the list includes the first required session attribute, whether the allowed session attribute of the relay device includes the first required session attribute.

It may be understood that, in the foregoing embodiment, the first message includes only information about the first required session attribute. In this embodiment of this application, the first message may further include information about more types of required session attributes. In this way, the response message of the first message may be sent by the relay device when all required session attributes satisfied, or the response message may be sent when some required session attributes are satisfied.

Step 303 may be replaced with the following step: When the relay device satisfies the first required session attribute, the relay device sends the response message of the first message to the remote device.

A specific implementation in which the relay device satisfies the first required session attribute may be that the allowed session attribute of the relay device includes the first required session attribute.

FIG. 4 is a schematic flowchart of a communication method according to another embodiment of this application.

It should be noted that meanings indicated by same terms in the embodiment shown in FIG. 4 and the embodiment shown in FIG. 3 may be the same. To avoid repetition, details are not described herein again.

401. A relay device obtains first information, where the first information includes an allowed session attribute of the relay device or identification information of the allowed session attribute of the relay device.

Specifically, the relay device may learn a required session attribute of the relay device or identification information of the required session attribute.

It may be understood that the allowed session attribute of the relay device may be all allowed session attributes of the relay device, or may be some allowed session attributes that are of the relay device and that are determined based on a current state.

It may be further understood that a manner of determining the allowed session attribute of the relay device may be implemented in various manners in the embodiment shown in FIG. 3. To avoid repetition, details are not described herein again.

Optionally, the identification information of the allowed session attribute includes a group identifier ID or a relay service code.

Optionally, the identification information of the allowed session attribute has a mapping relationship with the allowed session attribute.

Specifically, the relay device determines, based on the mapping relationship, the identification information corresponding to the allowed session attribute.

402. The relay device sends the first information to a remote device. Correspondingly, the remote device receives the first information from the relay device.

Specifically, in this embodiment of this application, one relay device is used as an example for description, but this application is not limited thereto. According to the steps shown in FIG. 4, another relay device may also determine whether to send the first information and determine a manner of sending the first information.

In an example, the relay device may periodically send first information or send the first information at a specific time point. For example, the relay device may broadcast the first information.

In another example, before step 401, the relay device may receive a first request message sent by the remote device, send a response message of the first request message to the remote device, and include the first information in the response message of the first request message, where the first request message is used to request the allowed session attribute of the relay device.

Specifically, the relay device can send the first information to the remote device only when the remote device has a requirement. This avoids wastes caused because the relay device sends the first information when the remote device has no requirement, thereby reducing resource wastes.

403. The remote device determines a target relay device of the remote device based on the first information and a first required session attribute of the remote device, where the target relay device is configured to provide a relay service for the remote device.

Specifically, the remote device may determine, based on whether the allowed session attribute included in the first information includes the first required session attribute, or based on whether an allowed session attribute corresponding to the identification information of the allowed session attribute includes the first required session attribute, whether a relay device that sends the first information can be used as the target relay device. That is, the remote device can determine whether the relay device can be the target relay device of the remote device based on the first information that includes the allowed session attribute of the relay device or the identification information of the allowed session attribute of the relay device and that is sent by the relay device and the required session attribute of the remote device. In this way, the remote device can select a more appropriate relay device, to improve communication efficiency.

It may be understood that after selecting the target relay device, the remote device may further send the response message to the relay device sending the first information. The remote device may send the response message only to the target relay device, and a relay device receiving the response message may learn that the relay device is selected as the target relay device. Alternatively, the remote device sends the response message to each relay device sending the first information, where the response message may indicate whether a corresponding relay device is selected as the target relay device. The response message may further include the first required session attribute and/or a session request for establishing a first session connection.

Optionally, the remote device may determine, based on the mapping relationship and the identification information, the allowed session attribute corresponding to the identification information.

Optionally, in an implementation scenario of the foregoing embodiment, step 403 may specifically include:

if an allowed session attribute of only one relay device (for example, a first relay device) includes the first required session attribute, determining the first relay device as the target relay device.

In another embodiment, in step 403, when allowed session attributes of at least two relay devices include the first required session attribute, the remote device may select one relay device from the at least two relay devices as the target relay device.

Specifically, a plurality of relay devices send the first information to the remote device, allowed session attributes of at least two relay devices includes the first required session attribute, and the remote device selects, for example, randomly selects the target relay device from the at least two relay devices.

Optionally, the first information may further include another session attribute in addition to the first required session attribute in the allowed session attribute of the relay device. In this case, the remote device may determine the target relay device from the at least two relay devices based on the another session attribute in the allowed session attribute of the relay devices.

Specifically, when the allowed session attributes of the at least two relay devices include the first required session attribute, the remote device may select the target relay device based on other session attributes in addition to the first required session attribute in the allowed session attributes of the at least two relay devices. For example, the remote device may select the target relay device based on a quantity of types of other session attributes, or select the target relay device based on content of other session attributes. For example, the remote device selects a relay device with a plurality of types of other session attributes as the target relay device, or may select a relay device with an allowed session attribute including a type of session attributes as the target relay device.

Embodiments described in this specification may be independent solutions, or may be combined based on internal logic. These solutions all fall within the protection scope of this application.

It may be understood that, in the foregoing method embodiments, the methods and the operations implemented by the remote device may alternatively be implemented by a component (for example, a chip or a circuit) used in the remote device, and the methods and the operations implemented by the relay device may alternatively be implemented by a component (for example, a chip or a circuit) used in the relay device.

The foregoing mainly describes the solutions provided in embodiments of this application from a perspective of interaction. It may be understood that, to implement the foregoing functions, each network element, such as a transmit-end device or a receive-end device, includes a corresponding hardware structure and/or software module for performing each function. A person skilled in the art may be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional module division may be performed on the transmit-end device or the receive-end device according to the examples of the methods. For example, various functional modules may be divided according to the corresponding functions, or two or more functions may be integrated into one processing module. The integrated module may be implemented in a form of hardware, or may be implemented in a form of a software functional module. It should be noted that, in embodiments of this application, module division is an example, and is merely logical function division. In actual implementation, another division manner may be used. An example in which various functional modules are divided according to the corresponding functions is used below for description.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The foregoing describes in detail the methods provided in embodiments of this application with reference to FIG. 3 and FIG. 4. The following describes in detail apparatuses provided in embodiments of this application with reference to FIG. 5 to FIG. 11. It should be understood that descriptions of the apparatus embodiments correspond to the descriptions of the method embodiments. Therefore, for content that is not described in detail, refer to the foregoing method embodiments. For brevity, details are not described herein again.

Figure 5:
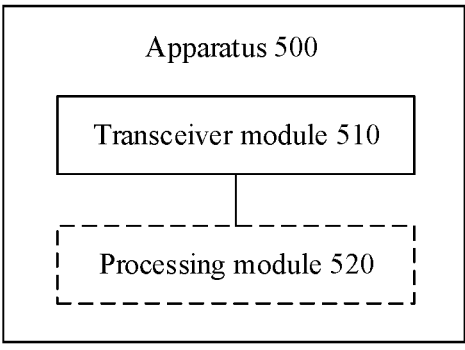
FIG. 5 is a schematic block diagram of a communication apparatus according to an embodiment of this application.

FIG. 5 is a schematic block diagram of a communication apparatus 500 according to an embodiment of this application.

It should be understood that the apparatus 500 may correspond to the UE shown in FIG. 1, the remote device shown in FIG. 2, or the remote device shown in FIG. 3, and may have any function of the remote device in the method embodiment shown in FIG. 3. The apparatus 500 includes a transceiver module 510. Optionally, the apparatus 500 further includes a processing module 520.

The transceiver module 510 is configured to obtain a first required session attribute or identification information of the first required session attribute.

The transceiver module 510 is further configured to send a first message, where the first message includes the first required session attribute or the identification information of the first required session attribute.

Optionally, the transceiver module 510 is further configured to receive a response message that is of the first message and that is from a candidate relay device, where the response message of the first message is used to indicate that an allowed session attribute of the candidate relay device includes the first required session attribute.

The processing module 520 is configured to determine a target relay device of the remote device based on the response message of the candidate relay device, where the target relay device is configured to provide a relay service for the remote device.

Optionally, the candidate relay device includes at least two relay devices, and the response message further includes another session attribute in addition to the first required session attribute in the allowed session attribute of the candidate relay device. The processing module 520 is specifically configured to determine the target relay device based on the another session attribute of the candidate relay device.

Optionally, the first required session attribute includes at least one of required slice information, data network information, an access type, or a session type.

Optionally, the transceiver module 510 is further configured to send a second message to the target relay device, where the second message includes a second required session attribute of the remote device or identification information of the second required session attribute of the remote device.

The transceiver module 510 is further configured to receive a response message that is of the second message and that is from the target relay device, where the response message of the second message is used to indicate that an allowed session attribute of the target relay device includes the second required session attribute.

Optionally, the identification information of the first required session attribute has a mapping relationship with the first required session attribute.

Optionally, the identification information of the first required session attribute includes a group identifier ID or a relay service code of the remote device.

Figure 6:
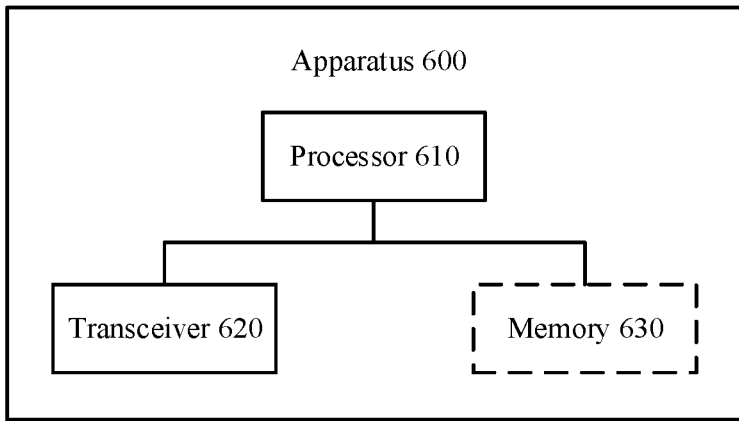
FIG. 6 is a schematic structural diagram of a communication apparatus according to an embodiment of this application.

FIG. 6 shows a communication apparatus 600 according to an embodiment of this application. The apparatus 600 may be the remote device described in FIG. 2. The apparatus may use a hardware architecture shown in FIG. 6. The apparatus may include a processor 610 and a transceiver 620. Optionally, the apparatus may further include a memory 630. The processor 610, the transceiver 620, and the memory 630 communicate with each other through an internal connection path. A related function implemented by the processing module 520 in FIG. 5 may be implemented by the processor 610, and a related function implemented by the transceiver module 510 may be implemented by the processor 610 by controlling the transceiver 620.

Optionally, the processor 610 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to: control the communication apparatus (for example, a base station, a terminal, or a chip), execute a software program, and process data of the software program.

Optionally, the processor 610 may include one or more processors, for example, include one or more central processing units (CPUs). When the processor is one CPU, the CPU may be a single-core CPU, or may be a multi-core CPU.

The transceiver 620 is configured to send and receive data and/or a signal, and receive data and/or a signal. The transceiver may include a transmitter and a receiver. The transmitter is configured to send data and/or a signal, and the receiver is configured to receive data and/or a signal.

The memory 630 includes but is not limited to a random access memory (RAM), a read-only memory (ROM), an erasable programmable memory (EPROM), and a compact disc read-only memory (CD-ROM). The memory 630 is configured to store related instructions and data.

The memory 630 is configured to store program code and data of the remote device, and may be a separate component or integrated into the processor 610.

Specifically, the processor 610 is configured to control the transceiver to perform information transmission with a relay device. For details, refer to the descriptions in the foregoing method embodiments. Details are not described herein again.

During specific implementation, in an embodiment, the apparatus 600 may further include an output device and an input device. The output device communicates with the processor 610, and may display information in a plurality of manners. For example, the output device may be a liquid crystal display (LCD), a light emitting diode (LED) display device, a cathode ray tube (CRT) display device, or a projector. The input device communicates with the processor 610, and may receive an input from a user in a plurality of manners. For example, the input device may be a mouse, a keyboard, a touchscreen device, or a sensor device.

It may be understood that FIG. 6 only shows a simplified design of the communication apparatus. During actual application, the apparatus may further include other necessary components, including but not limited to any quantity of transceivers, processors, controllers, memories, and the like, and all remote devices that can implement this application shall fall within the protection scope of this application.

In a possible design, the apparatus 600 may be a chip, for example, may be a communication chip that can be used in the remote device, and configured to implement a related function of the processor 610 in the remote device. The chip may be a field programmable gate array, a dedicated integrated chip, a system chip, a central processing unit, a network processor, a digital signal processing circuit, or a microcontroller that implements the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a remote device or may be a circuit. The apparatus may be configured to perform an action performed by the remote device in the foregoing method embodiments.

Figure 7:
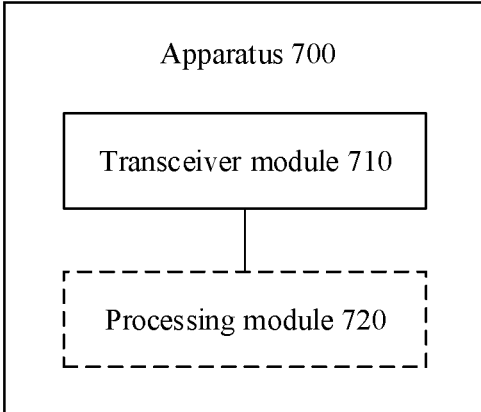
FIG. 7 is a schematic block diagram of a communication apparatus according to another embodiment of this application.

FIG. 7 is a schematic block diagram of a communication apparatus 700 according to an embodiment of this application.

It should be understood that the apparatus 700 may correspond to the relay device in embodiments shown in FIG. 2 to FIG. 4 and may have any function of the relay device in the methods. The apparatus 700 includes a transceiver module 710. Optionally, the apparatus 700 may further include a processing module 720.

The transceiver module 710 is configured to receive a first message from a remote device, where the first message includes a first required session attribute or identification information of the first required session attribute.

The transceiver module is further configured to send a response message of the first message to the remote device when an allowed session attribute of the relay device includes the first required session attribute.

Optionally, the first required session attribute includes at least one of required slice information, data network information, an access type, or a session type.

Optionally, when the first required session attribute includes the required slice information, the processing module 720 is configured to: when an allowed slice of the relay device includes a first slice indicated by the required slice information, determine that the allowed session attribute of the relay device includes the first required session attribute.

Optionally, when the first required session attribute includes the required slice information, the transceiver module 710 is further configured to send a request message to an access network device when a configured slice of the relay device includes a first slice indicated by the required slice information, where the request message is used to request authorization for the first slice. The transceiver module 710 is further configured to receive a response message of the request message, where the response message of the request message is used to indicate that the first slice is an allowed slice. The processing module 720 is configured to determine, based on the response message, that the allowed session attribute of the relay device includes the first required session attribute.

Optionally, the identification information of the first required session attribute has a mapping relationship with the first required session attribute. The processing module 720 is configured to determine the first required session attribute based on the mapping relationship and the identification information of the first required session attribute.

Optionally, the identification information of the first required session attribute includes a group identifier ID or a relay service code of the remote device.

Optionally, the transceiver module 710 is further configured to receive a second message from the remote device, where the second message includes a second required session attribute of the remote device. The transceiver module 710 is further configured to send a response message of the second message when the allowed session attribute of the relay device includes the second required session attribute.

Optionally, the response message of the first message includes another session attribute in addition to the first required session attribute in the allowed session attribute of the relay device.

Figures 8, 9:
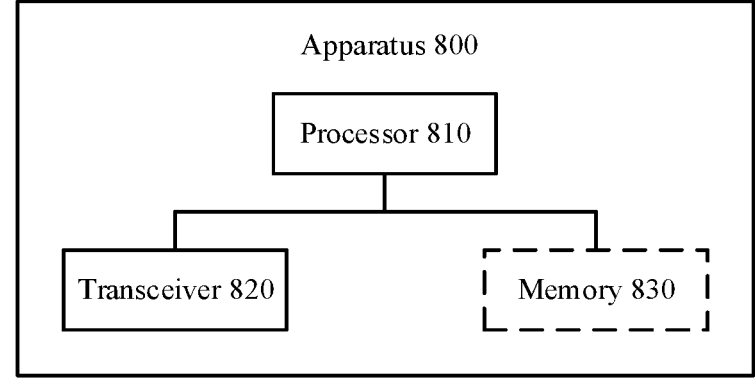
FIG. 8 is a schematic structural diagram of a communication apparatus according to another embodiment of this application.
FIG. 9 is a schematic structural diagram of a communication apparatus according to another embodiment of this application.

FIG. 8 shows a communication apparatus 800 according to an embodiment of this application. The apparatus 800 may be the relay device described in FIG. 2. The apparatus may use a hardware architecture shown in FIG. 8. The apparatus may include a processor 810 and a transceiver 820. Optionally, the apparatus may further include a memory 830. The processor 810, the transceiver 820, and the memory 830 communicate with each other through an internal connection path. A related function implemented by the processing module 720 in FIG. 7 may be implemented by the processor 810, and a related function implemented by the transceiver module 710 may be implemented by the processor 810 by controlling the transceiver 820.

Optionally, the processor 810 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to: control the communication apparatus (for example, a base station, a terminal, or a chip), execute a software program, and process data of the software program.

Optionally, the processor 810 may include one or more processors, for example, include one or more central processing units (CPUs). When the processor is one CPU, the CPU may be a single-core CPU, or may be a multi-core CPU.

The transceiver 820 is configured to send and receive data and/or a signal, and receive data and/or a signal. The transceiver may include a transmitter and a receiver. The transmitter is configured to send data and/or a signal, and the receiver is configured to receive data and/or a signal.

The memory 830 includes but is not limited to a random access memory (RAM), a read-only memory (ROM), an erasable programmable memory (EPROM), and a compact disc read-only memory (CD-ROM). The memory 830 is configured to store related instructions and data.

The memory 830 is configured to store program code and data of the relay device, and may be a separate device or integrated into the processor 810.

Specifically, the processor 810 is configured to control the transceiver to perform information transmission with a terminal, to implement the descriptions in the foregoing method embodiments. Details are not described herein again.

During specific implementation, in an embodiment, the apparatus 800 may further include an output device and an input device. The output device communicates with the processor 810, and may display information in a plurality of manners. For example, the output device may be a liquid crystal display (LCD), a light emitting diode (LED) display device, a cathode ray tube (CRT) display device, or a projector. The input device communicates with the processor 810, and may receive an input from a user in a plurality of manners. For example, the input device may be a mouse, a keyboard, a touchscreen device, or a sensor device.

It may be understood that FIG. 8 only shows a simplified design of the communication apparatus. During actual application, the apparatus may further include other necessary components, including but not limited to any quantity of transceivers, processors, controllers, memories, and the like, and all relay devices that can implement this application shall fall within the protection scope of this application.

In a possible design, the apparatus 800 may be a chip, for example, may be a communication chip that can be used in the relay device, and configured to implement a related function of the processor 810 in the relay device. The chip may be a field programmable gate array, a dedicated integrated chip, a system chip, a central processing unit, a network processor, a digital signal processing circuit, or a microcontroller that implements the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a relay device or may be a circuit. The apparatus may be configured to perform an action performed by the relay device in the foregoing method embodiments.

Optionally, when the apparatus in this embodiment is a remote device, FIG. 9 is a simplified schematic structural diagram of the remote device. For ease of understanding and illustration, in FIG. 9, a mobile phone is used as an example of the remote device. As shown in FIG. 9, the remote device includes a processor, a memory, a radio frequency circuit, an antenna, and an input/output apparatus. The processor is mainly configured to: process a communication protocol and communication data, control the remote device, execute a software program, process data of the software program, and so on. The memory is configured to store the software program and the data. The radio frequency circuit is mainly configured to perform conversion between a baseband signal and a radio frequency signal and process the radio frequency signal. The antenna is mainly configured to receive and send a radio frequency signal in a form of an electromagnetic wave. The input/output apparatus such as a touchscreen, a display screen, or a keyboard is mainly configured to: receive data entered by a user, and output data to the user. It should be noted that some types of remote devices may not have the input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal through the antenna in a form of an electromagnetic wave. When data is sent to the remote device, the radio frequency circuit receives the radio frequency signal by using the antenna, converts the radio frequency signal into a baseband signal, and outputs the baseband signal to the processor, and the processor converts the baseband signal into data and processes the data. For ease of description, FIG. 9 shows only one memory and one processor. In an actual remote device product, there may be one or more processors and one or more memories. The memory may also be referred to as a storage medium, a storage device, or the like. The memory may be disposed independently on the processor, or may be integrated with the processor. This is not limited in this embodiment of this application.

In this embodiment of this application, the antenna and the radio frequency circuit that have a transceiver function may be considered as a transceiver unit of the remote device, and the processor that has a processing function may be considered as a processing unit of the remote device. As shown in FIG. 9, the remote device includes a transceiver unit 910 and a processing unit 920. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes a receiving unit and a sending unit. The transceiver unit may sometimes be referred to as a transceiver, a transceiver circuit, or the like. The receiving unit may sometimes be referred to as a receiver, a receiver circuit, or the like. The sending unit may sometimes be referred to as a transmitter, a transmitter circuit, or the like.

It should be understood that, the transceiver unit 910 is configured to perform a sending operation and a receiving operation on the remote device in the foregoing method embodiments, and the processing unit 920 is configured to perform an operation other than the receiving and sending operations on the remote device in the foregoing method embodiments.

For example, in an implementation, the processing unit 920 is configured to perform the processing step 301 of the remote device in FIG. 3. The transceiver unit 910 is configured to perform the receiving and sending operations in step 302 and step 303 in FIG. 3, and/or the transceiver unit 910 is further configured to perform another receiving and sending step of the remote device in embodiments of this application.

When the apparatus is a chip, the chip includes a transceiver unit and a processing unit. The transceiver unit may be an input/output circuit or a communication interface. The processing unit is a processor, a microprocessor, or an integrated circuit that is integrated on the chip.

Figure 10:
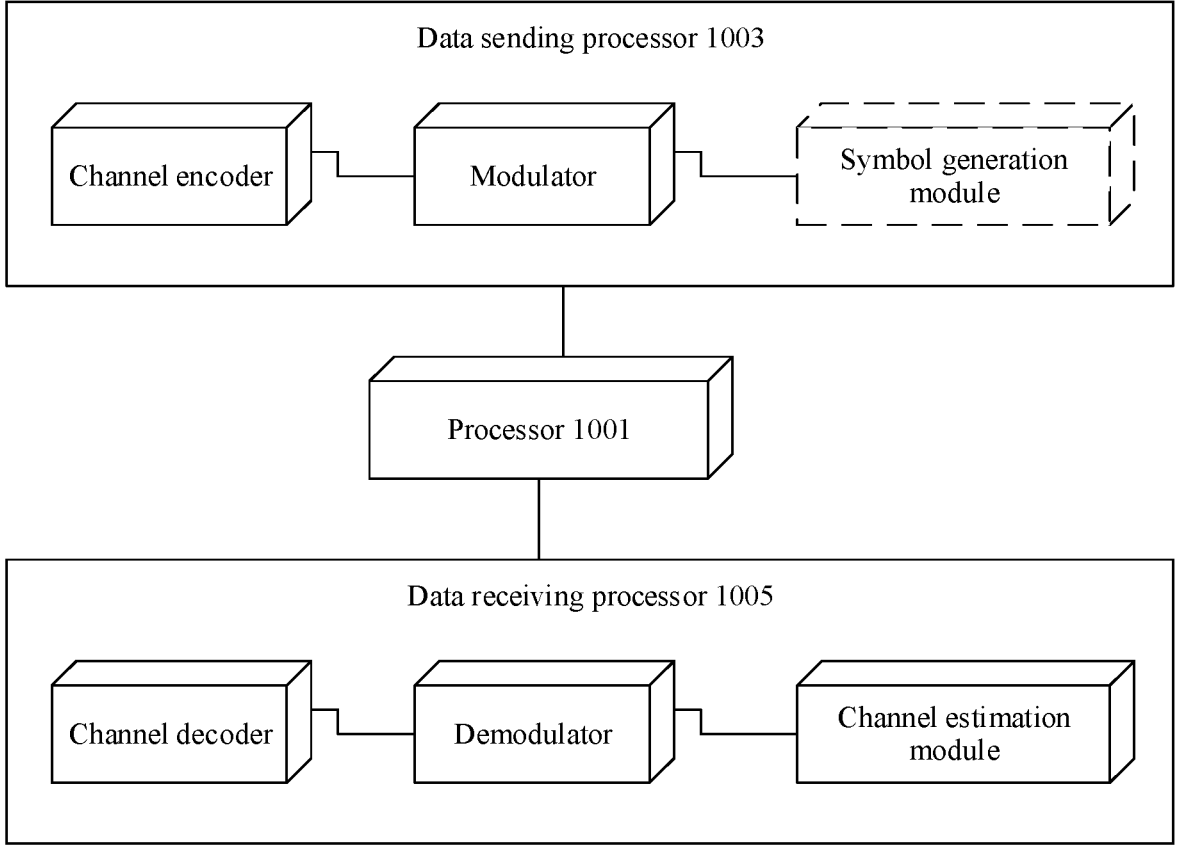
FIG. 10 is a schematic structural diagram of a communication apparatus according to another embodiment of this application.

Optionally, when the apparatus is a remote device, further refer to a device shown in FIG. 10. In an example, the device may implement a function similar to that of the processor 920 in FIG. 9. In FIG. 10, the device includes a processor 1001, a data sending processor 1003, and a data receiving processor 1005. The processing module 520 in the foregoing embodiment may be the processor 1001 in FIG. 10, and completes a corresponding function. The transceiver module 510 in the foregoing embodiment may be the data sending processor 1003 and the data receiving processor 1005 in FIG. 10. Although FIG. 10 shows a channel encoder and a channel decoder, it may be understood that these modules do not constitute a limitative description of this embodiment, but are only an example.

Figure 11:
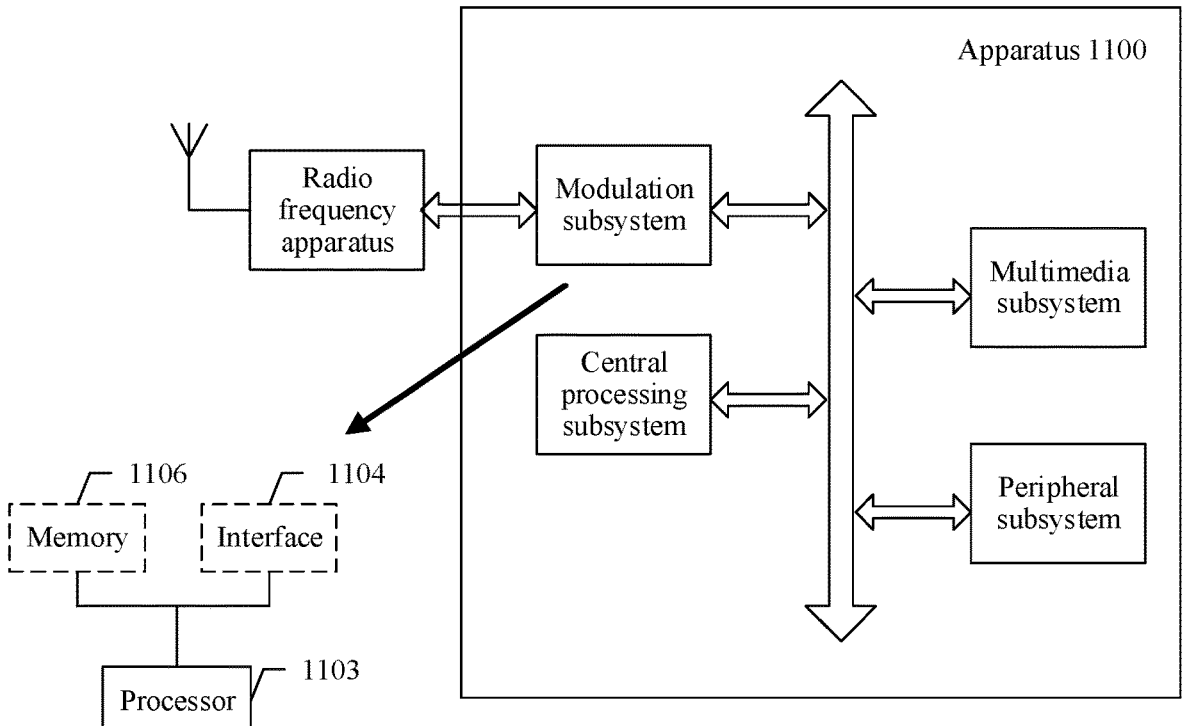
FIG. 11 is a schematic structural diagram of a communication apparatus according to another embodiment of this application.

FIG. 11 shows another form of this embodiment. A processing apparatus 1100 includes modules such as a modulation subsystem, a central processing subsystem, and a peripheral subsystem. A communication device in this embodiment may be used as the modulation subsystem therein. Specifically, the modulation subsystem may include a processor 1103 and an interface 1104. The processor 1103 completes a function of the processing module 520, and the interface 1104 completes a function of the transceiver module 510. In another variation, the modulation subsystem includes a memory 1106, the processor 1103, and a program that is stored in the memory and that is executable in the processor. When the program is executed by the processor, the methods in embodiments are implemented. It should be noted that the memory 1106 may be non-volatile or may be volatile, and may be located inside the modulation subsystem or in the processing apparatus 1100, provided that memory 1106 can be connected to the processor 1103.

In another form of this embodiment, a computer-readable storage medium is provided. The computer-readable storage medium stores instructions. When the instructions are executed, the action of the remote device or the relay device in the foregoing method embodiments is performed.

In another form of this embodiment, a computer program product including instructions is provided. When the instructions are executed, the action of the remote device or the relay device in the foregoing method embodiments is performed.

An embodiment of this application provides a communication system. The communication system includes a remote device and a relay device. The remote device and the relay device may be configured to perform the method in the embodiment shown in FIG. 3 or FIG. 4.

An embodiment of this application further provides a communication system. The communication system includes the remote device shown in FIG. 5 and the relay device shown in FIG. 7.

An embodiment of this application further provides a chip system. The chip system may be located on a remote device or a relay device, to implement a function related to the remote device or the relay device in the foregoing method embodiments, for example, processing the information or the message related to the foregoing method.

In a possible design, the chip system further includes a memory. The memory is configured to store program instructions and data that are necessary for a distributed unit, a centralized unit, the remote device, and the relay device. The chip system may include a chip, or may include a chip and another discrete component.

An embodiment of this application further provides a communication apparatus, including a memory and a processor. The memory is configured to store a computer program, and the processor is configured to invoke the computer program in the memory, to perform a function of the remote device or the relay device in the foregoing method embodiments.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It should be understood that, the processor may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double Data Rate SDRAM, DDR SDRAM), an enhanced synchronous dynamic random access memory (enhanced SDRAM, ESDRAM), a synchronous link dynamic random access memory (synchronous link DRAM, SLDRAM), and a direct rambus dynamic random access memory (direct rambus RAM, DR RAM).

In this application, "at least one" means one or more, and "a plurality of" means two or more. The term "and/or"

describes an association relationship between associated objects and indicates that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of a singular item (piece) or plural items (pieces). For example, at least one of a, b, or c may indicate: a, b, c, a and b, a and c, b and c, or a, b, and c, where a, b, and c may be singular or plural.

It should be understood that "an embodiment" or "an embodiment" mentioned in the entire specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in embodiments of the present invention. The execution sequences of the processes should be determined according to functions and internal logic of the processes, and should not be construed as any limitation on the implementation processes of embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, an object, an executable file, a thread of execution, a program, and/or a computer. As shown in figures, both an application that runs on a computing device and a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as an internet interacting with other systems by using the signal).

It should further be understood that "first", "second", and various numerical symbols in this specification are merely used for distinguishing for ease of description, and are not intended to limit the scope of embodiments of this application.

The term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or an access network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

38

What is claimed is:

1. An apparatus, comprising at least one processor and one or more memories coupled to the at least one processor and storing programming instructions for execution by the at least one processor to:
obtain identification information of a first required session attribute, wherein the first required session attribute comprises required slice information;
send a discovery request message, wherein the discovery request message comprises the identification information of the first required session attribute, and wherein the identification information of the first required session attribute is a relay service code of the apparatus;
receive a response message of the discovery request message from a candidate relay device; and
determine a target relay device of the apparatus based on the response message from the candidate relay device, wherein the target relay device is configured to provide a relay service for the apparatus.

2. The apparatus according to claim 1, wherein the identification information of the first required session attribute has a mapping relationship with the first required session attribute.

3. The apparatus according to claim 2, wherein one or more memories store programming instructions for execution by the at least one processor to:
receive the mapping relationship from a policy control function (PCF).

4. A method, comprising:
obtaining identification information of a first required session attribute, wherein the first required session attribute comprises required slice information;
sending a discovery request message, wherein the discovery request message comprises the identification information of the first required session attribute, and wherein the identification information of the first required session attribute is a relay service code of a remote device;
receiving a response message of the discovery request message from a candidate relay device; and
determining a target relay device of the remote device based on the response message from the candidate relay device, wherein the target relay device is configured to provide a relay service for the remote device.

5. The method according to claim 4, wherein the identification information of the first required session attribute has a mapping relationship with the first required session attribute.

6. The method according to claim 5, further comprising:
receive the mapping relationship from a policy control function (PCF).

7. One or more non-transitory computer-readable media storing computer instructions, that when executed by one or more processors, cause a computing device to perform operations comprising:
obtaining identification information of a first required session attribute, wherein the first required session attribute comprises required slice information;
sending a discovery request message, wherein the discovery request message comprises the identification information of the first required session attribute, and wherein the identification information of the first required session attribute is a relay service code of a remote device;
receiving a response message of the discovery request message from a candidate relay device; and
determining a target relay device of the remote device based on the response message from the candidate relay device, wherein the target relay device is configured to provide a relay service for the remote device.

8. The one or more non-transitory computer-readable media according to claim 7, wherein the identification information of the first required session attribute has a mapping relationship with the first required session attribute.

9. The one or more non-transitory computer-readable media according to claim 8, wherein the operations further comprise:

receive the mapping relationship from a policy control function (PCF).

\* \* \* \* \*